(12) United States Patent
Choi

(10) Patent No.: US 9,575,404 B2
(45) Date of Patent: Feb. 21, 2017

(54) VIRTUAL REALITY THEATER STRUCTURE

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 14/986,894

(22) Filed: Jan. 4, 2016

(65) Prior Publication Data

US 2016/0213148 A1    Jul. 28, 2016

(30) Foreign Application Priority Data

Jan. 23, 2015 (KR) .................. 10-2015-0011046

(51) Int. Cl.
| | | |
|---|---|---|
| *G03B 21/14* | (2006.01) | |
| *E04H 3/30* | (2006.01) | |
| *G03B 21/604* | (2014.01) | |
| *G09B 9/12* | (2006.01) | |
| *A47C 1/12* | (2006.01) | |

(52) U.S. Cl.
CPC .............. *G03B 21/604* (2013.01); *A47C 1/12* (2013.01); *E04H 3/30* (2013.01); *G09B 9/12* (2013.01)

(58) Field of Classification Search
CPC ................ E04H 3/22; E04H 3/24; E04H 3/28; E04H 3/30
USPC .............................. 352/1, 40, 88, 240; 52/6–9
See application file for complete search history.

(56) References Cited

U.S. PATENT DOCUMENTS

| | | | | |
|---|---|---|---|---|
| 2,280,206 A | * | 4/1942 | Waller | G03B 37/00 352/36 |
| 3,628,829 A | * | 12/1971 | Heilig | A47C 1/12 297/180.14 |
| 3,922,030 A | * | 11/1975 | Stedman | B60N 2/38 267/131 |
| 3,926,396 A | * | 12/1975 | Hall | B60N 2/143 108/142 |
| 4,600,239 A | * | 7/1986 | Gerstein | A61G 3/06 248/425 |
| 5,765,314 A | * | 6/1998 | Giglio | E04H 3/22 472/75 |
| 6,201,516 B1 | * | 3/2001 | Tanide | A63J 25/00 345/7 |
| 6,880,939 B2 | * | 4/2005 | Colucci | G02B 27/18 353/122 |

FOREIGN PATENT DOCUMENTS

| | | |
|---|---|---|
| KR | 10-1995-0016630 A | 6/1995 |
| KR | 20-2004-0018973 Y1 | 7/2004 |
| KR | 10-2008-7023047 A | 9/2008 |
| KR | 20-2010-0013407 U | 12/2010 |
| KR | 10-2011-0071429 A | 7/2011 |

* cited by examiner

*Primary Examiner* — William C Dowling
(74) *Attorney, Agent, or Firm* — Bacon & Thomas, PLLC

(57) ABSTRACT

A virtual reality theater structure, including a reflection screen which has a view angle of up down 40-360° and left right 120-360°, an effective range for virtual reality, and has a reflection rate of 1.1 gain or more; a projection system for projecting the 2D or 3D image for left eye and the 2D or 3D image for right eye on the reflection screen; and a chair structure that is rotatable up and downward 40-120° and left and rightward 120-360° where each chair is rotated with area of independent range that is separated individually.

13 Claims, 5 Drawing Sheets

VIRTUAL REALITY THEATER STRUCTURE

CROSS-REFERENCE(S) TO RELATED APPLICATION

This application claims priority of Korean Patent Application No. 10-2015-0011046, filed on Jan. 23, 2015, in the Korean Intellectual Property Office, which is hereby incorporated by reference in its entirety.

BACKGROUND OF THE INVENTION

The present invention relates to a virtual reality theater structure through which an image range of up down 40-180° and left right 180-360° can be viewed in a theater structure.

Generally, a screen is arranged on only one surface among four of a front and rear surfaces and a left and right surfaces inside a theater, and the fixing type seats facing the screen are provided within left right 60° based on the seats arranged on a center of a middle row.

Recently, as the virtual reality image is developed, the 2D or 3D image can be viewed on the left right screens, the rear screen and the up down screens wherein the image is provided, corresponding to the moving direction of the view angle of a viewer, and the virtual reality image usually a wide view angle of up down 40-360° and left right 120-360°.

Referring to circular moving theater, disclosed in Korean Patent Application No. 10-2008-7023047, the screen structure is varied up and downward based on the fixed chairs, a viewer may view the images of a fixing direction of the chair unless he/she rotates his/her head on the chair.

Referring to a dome type theater, disclosed in Korean Patent Application No. 10-1995-0016630, the chairs at every story, which are arranged along a vertical one line comparing to the vertical dome type screen fixed to a front surface of a theater, are only moved front and rearward but the view angle is not provided in accordance with the rotation direction of the chairs themselves.

Meanwhile, referring to "pneumatic support simulator device and a portable theater system using the same", disclosed in Korean Patent Application No. 10-2011-0071429, the load of the theater is amended by pneumatic pressure and the motion driving part is driven by 3 shafts, but it is not the structure where the chairs are rotated front and rearward and left and rightward.

Referring to the structure, disclosed in Korean Utility Model Application No. 20-2004-0018973, a plurality of chairs are vibrated simultaneously but they are not rotated up and downward, and further referring to the structure, disclosed in Korean Utility Model Application No. 20-2010-0013407, a simple vibration device using 3 directional air springs is provided.

Accordingly, the theater structure and the chair structure for a theater cannot be applied to a virtual reality theater structure in which the view angle is moved up and downward and rotated left and rightward and the image corresponding to the view angle is felt.

SUMMARY OF THE INVENTION

The present invention has been proposed to solve the drawback as described above and an aspect of the present invention is directed to a virtual reality theater structure through which subjects can be experienced like on site such that a viewer views the image corresponding to the view angle of the rotation of a chair on which the viewer seats while the picture of 2D or 3D image is rotated front and rearward and left and rightward 120-360° based on a horizontal direction and the picture thereof is rotated up and downward 40-300°. By solving the problems of a conventional art that the viewing angle is fixed and the chair is fixed in a theater structure, the present invention intends to provide the virtual reality theater structure in which a screen of a dome type, a circular type, a polygonal type and a cylindrical type is provided, on which the front rear and left right images of up down 120-360° and the up down image presented at a view angle of 40-360° are displayed, and the chair structure that is rotated front and rearward and the left and rightward 120-360° and up and downward 40-120° is provided.

A virtual reality theater structure of the present invention includes a reflection screen which has a view angle of up down 40-360° and left right 120-360°, an effective range for virtual reality, and has a reflection rate of 1.1 gain or more, a projection system or a projector for projecting the 2D or 3D image for left eye and the 2D or 3D image for right eye on the reflection screen, and the up down rotation plate 2 provided on the left and right sides of the chair. Further, the up down rotation central shaft 3 is provided on the up down rotation plate 2, allowing the chair to be rotated up and downward 40-120°, an rotation plate 5 that rotates left and rightward 120-360° is provided below the up down rotation plate 2 wherein the rotation central shaft 7 is introduced into a center of the rotation plate 5. Meanwhile, the buffering devices are provided on both left right sides between a lower part of the chair and the rotation plate 5 based on the rotation central shaft 7, the rotation plate 5, the up down rotation plate 2 and the left and right buffering devices are rotated simultaneously based on the rotation central shaft 7 of the rotation plate 5 in the chair structure 100. In addition, the chair is arranged to have an area of independent rotation radius to be rotated to 360°.

The virtual reality theater structure of the present invention is configured with a reflection screen which has a view angle of up down 40-360° and left right 120-360°, an effective range for virtual reality, and has a reflection rate of 1.1 gain or more, and the front rear and left right images of up down 120-360° and the 2D or 3D image for the left eye and the 2D or 3D image for the right eye are projected at a view angle of up and downward 40-120° and left and rightward 120-360° through a projection system on the screen, and thus the 2D image or 3D image that is polarized is displayed on the screen at all directions through which human beings view the image. Further, the chair can be rotated up and downward 40-120° and at the same time be rotated left and rightward 120-360° in the chair structure. That is, the up down rotation plate 2 allows the chair to be rotated up and downward around the rotation central shaft 3, and the rotation plate 5 is provided below the rotation central shaft 3 arranged on left and right sides wherein the rotation central shaft 7 is introduced into a center of the rotation plate 5. Meanwhile, the buffering device 4 is provided on both left and right sides of the rotation central shaft 7 and between a lower part of the chair and an upper surface of the rotation plate 5, and thus the rotation plate 5, the up down rotation plate 2 and the left and right buffering devices are rotated simultaneously. Accordingly, a viewer can view the up down image of 40-120° and the left and right image of 120-360° while seating on the chair 1 and thus can experience virtual reality, in a totally different way from a conventional theater where a viewer views the image on a screen oriented to one direction.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF THE INVENTION

Figure 1A:
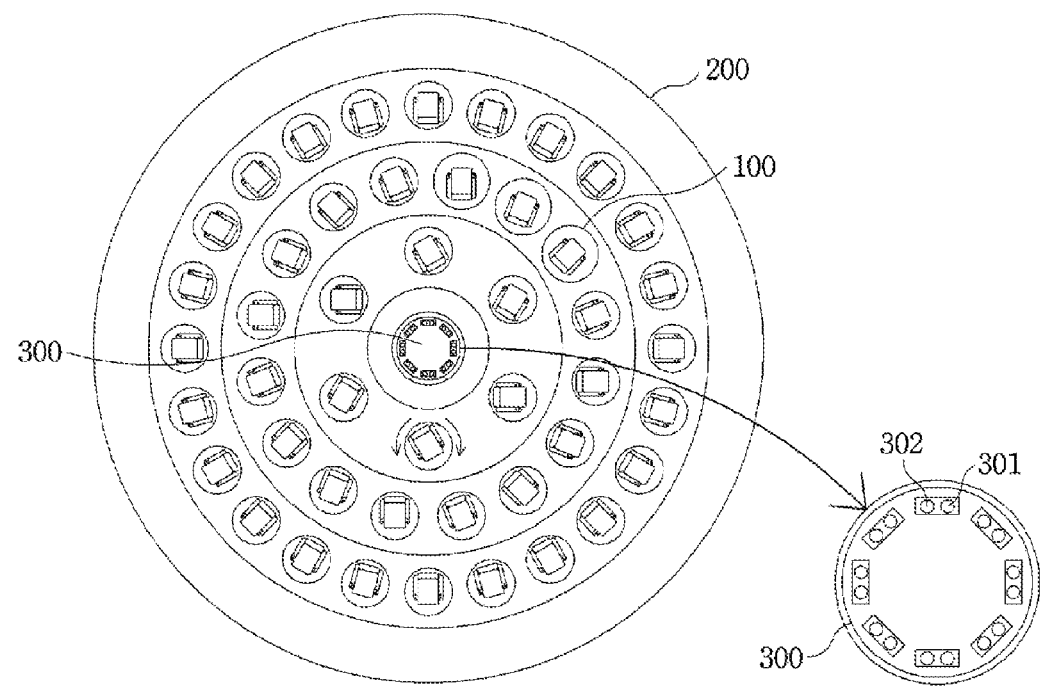
FIG. 1A is a plan view of a first embodiment of a virtual reality theater structure according to the present invention.

Exemplary embodiments of the present invention will be described below in detail with reference to the accompanying drawings. Wherever possible, the same reference numerals will be used to refer to the same elements throughout the specification, and a duplicated description thereof will be omitted.

A virtual reality theater structure of the present invention is featured such that a screen is applied with a reflection material such as aluminum to reflect 3D polarized light in a view angle of up down 40-300° and left right 120-360° based on a central location of the chair of a theater and have a reflection rate greater than 1.1 gain, a plurality of projectors for 2D or 3D image are provided for projecting the left eye image and the right eye image of 3D image on the screen, and the chair structure is provided, in which the chairs are arranged to be rotated up down 40-120° and left right 120-360° wherein the up and down rotation and the left and right rotation are possible simultaneously.

Figure 2A:
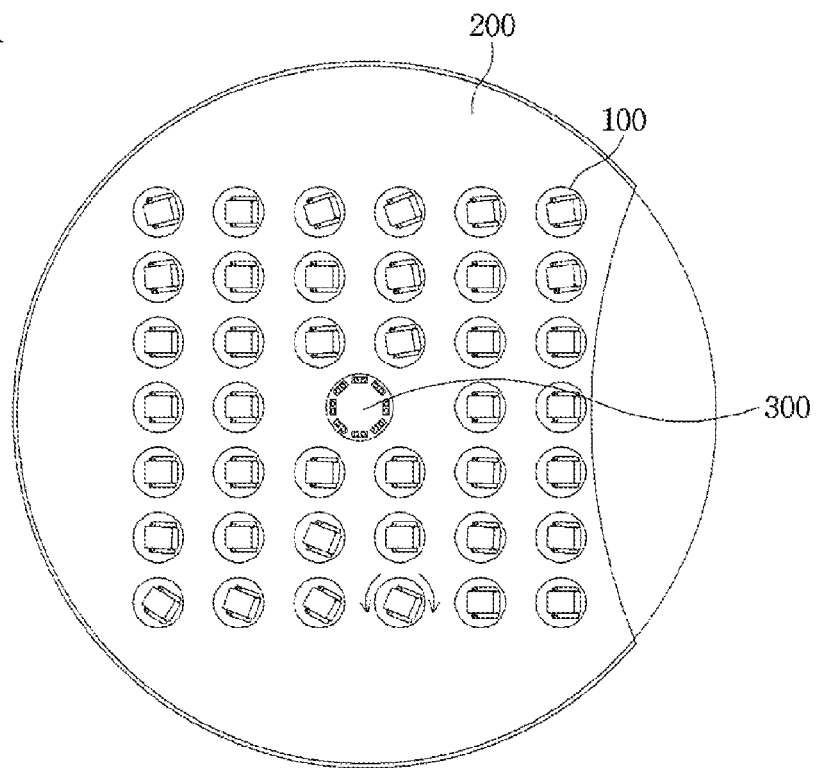
FIG. 2A is a plan view of a second embodiment of a virtual reality theater structure according to the present invention.

In particular, according to the theater structure of the present invention, as shown in FIG. 1A and FIG. 2A, each chair has an area of independent rotation radius to be rotated to 360°, differently from a conventional chair structure where the viewing direction is fixed to one direction.

Figure 5A:
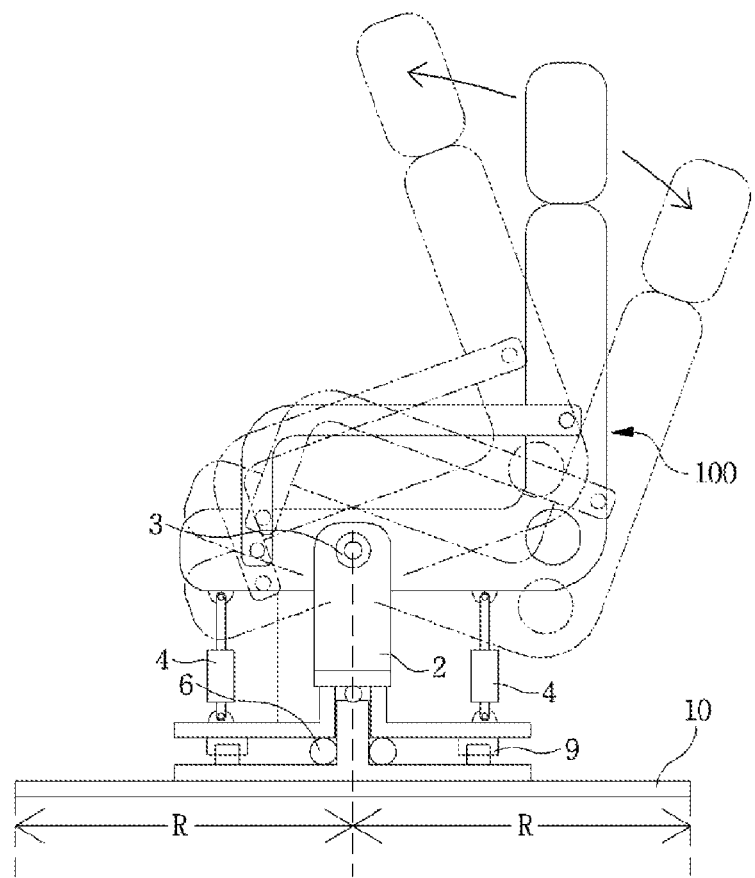
FIG. 5A is a view of an up down rotation central shaft of the chair structure of a virtual reality theater structure according to the present invention.

In more detail, as shown in FIG. 5A, a chair 100 is arranged per rotation radius R around which the chair is rotated around a central rotation shaft 7 and thus every viewer rotates per the chair 100. The reason that the view range at which the image is enjoyed by the rotations of the image, the screen and the chair is set to be up down 40-180° and left right 120-360° is because the virtual reality effects are decreased if the view angle is less than the range.

Figure 1B:
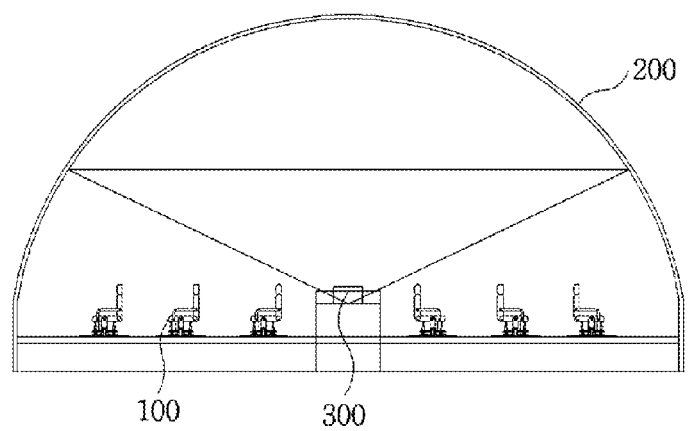
FIG. 1B is a side view of a large projection screen image device with a seesaw structure for virtual reality according to the present invention.

As shown in FIG. 1A and FIG. 1B, the dome screen structure is provided with a dome screen 180, circular screen, a polygonal screen or cylindrical screen and a projection system 300 for projecting 2D or 3D image is provided at a center thereof.

The projection system 300 is configured with a projector for the left eye image 302 and a projector for the right eye image 301 as a set so as to project divisionally the image on the screen. The projector for 3D image is provided with a fish eye lens as a projection lens to project widely the image by diving the image with up down 30-90° and left right 30-210° and further is provided with a plurality of projectors as the projector for the left eye image 302 and the projector for the right eye image 301, greater than a set.

Further, the screen structure 200 is provided with a dome screen, a circular screen, a cylindrical screen, a polygonal screen such as a triangular screen, a quadrangular screen, a pentagonal screen and a hexagonal screen, etc. In this case, aluminum is applied on a surface of the screen to reflect polarized light to form a reflection screen and the size of view angle on the screen is greater than up down 40° and left right 120° based on the location of a viewer who seats on a central chair.

The reason that the reflection rate of the screen is recommended to be greater than 1.1 gain is because it is possible to review 3D image by reflecting the polarized light using polarization eyeglass based on the reflection rate.

When the reflection rate is less than 1.1, the polarized image that is polarized on a polarization plate and projected is not reflected but scattered so that the polarized light is scattered thereby not to view the 3D image.

The images from the projector for left eye image 302 and the projector for right eye image 301 are projected at a polarization angle having a symmetrical polarization angle, and the image for left eye of the polarization eyeglass of a viewer is viewed through a left eye and the image for right eye thereof is viewed through a right eye in the polarized light reflection structure.

Figure 2B:
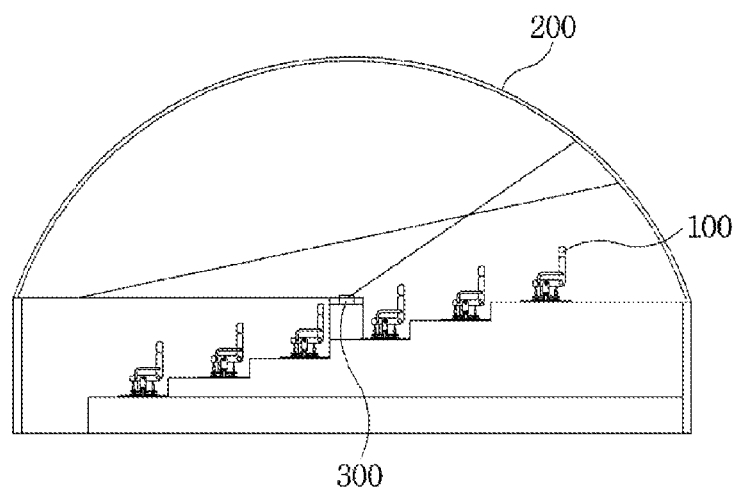
FIG. 2B is a side view of a second embodiment of a virtual reality theater structure according to the present invention.

The screen is configured such that the dome screen 180 is arranged at an oblique angle and the chair structure is configured such that the chair 1 is arranged at an oblique angle by the steps of the chair, as shown in FIG. 2A and FIG. 2B.

The screen structure is configured as a cylindrical shape or a cylindrical shape a part of which is opened, for example, as a structure having left and rightward 120°, 180°, 250°, 300°, 340°, 360° and up and downward 40°, 90°, 120°, 180°, 250°, 300°.

With respect to the structure of the chair that is combined to the screen structure, as shown in FIG. 1A, FIG. 2A, FIG. 3, FIG. 4, FIG. 5A and FIG. 5B, it may be rotated up and downward and at the same time left and rightward, and particularly it may be rotated up downward and left rightward simultaneously.

According to the structure of the present invention, as shown in FIG. 1A and FIG. 2A, when a viewer rotates left and rightward based on a front surface by his/her intention while he/she views a front picture, he/she can view the left or right picture and at the same time the image on an upper part, that is, on a ceiling and the image on a lower part, that is, on a bottom, thereby viewing a virtual reality image.

Figure 3:
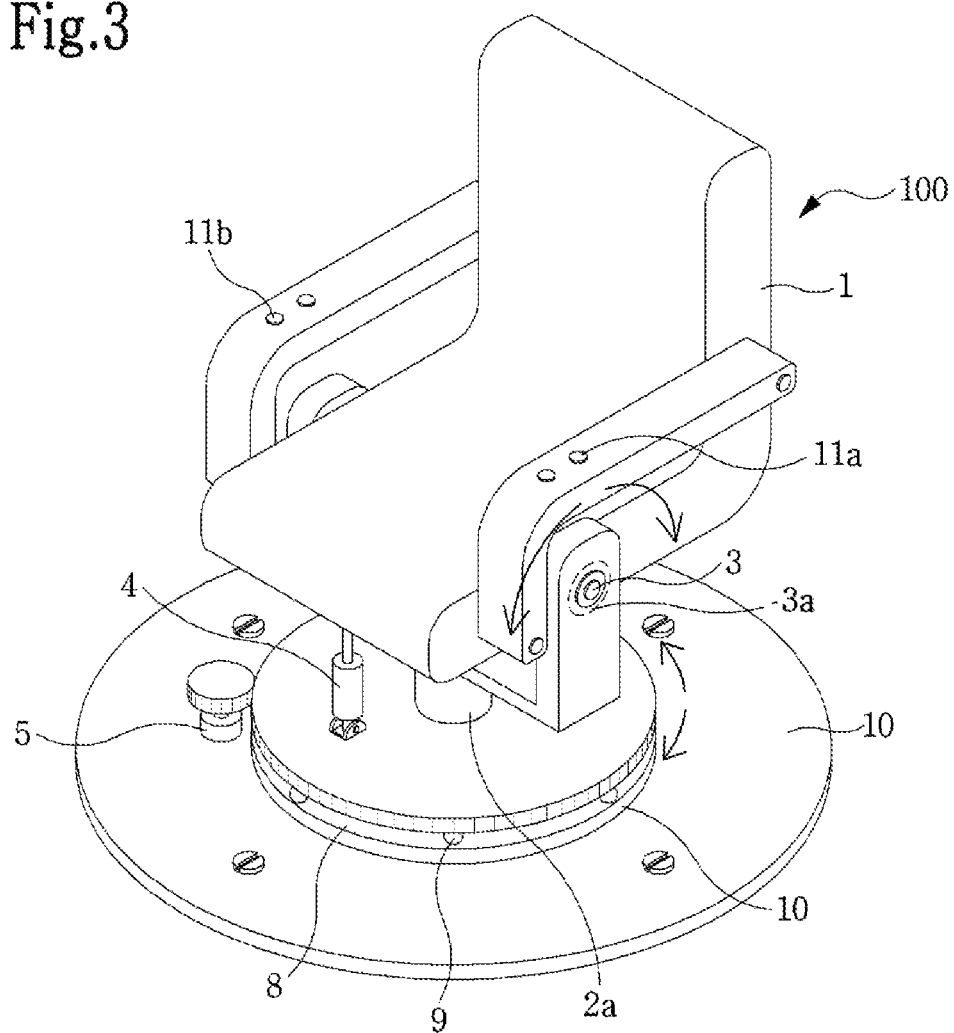
FIG. 3 is a perspective view of a chair structure of a virtual reality theater structure according to the present invention.
Figure 4:
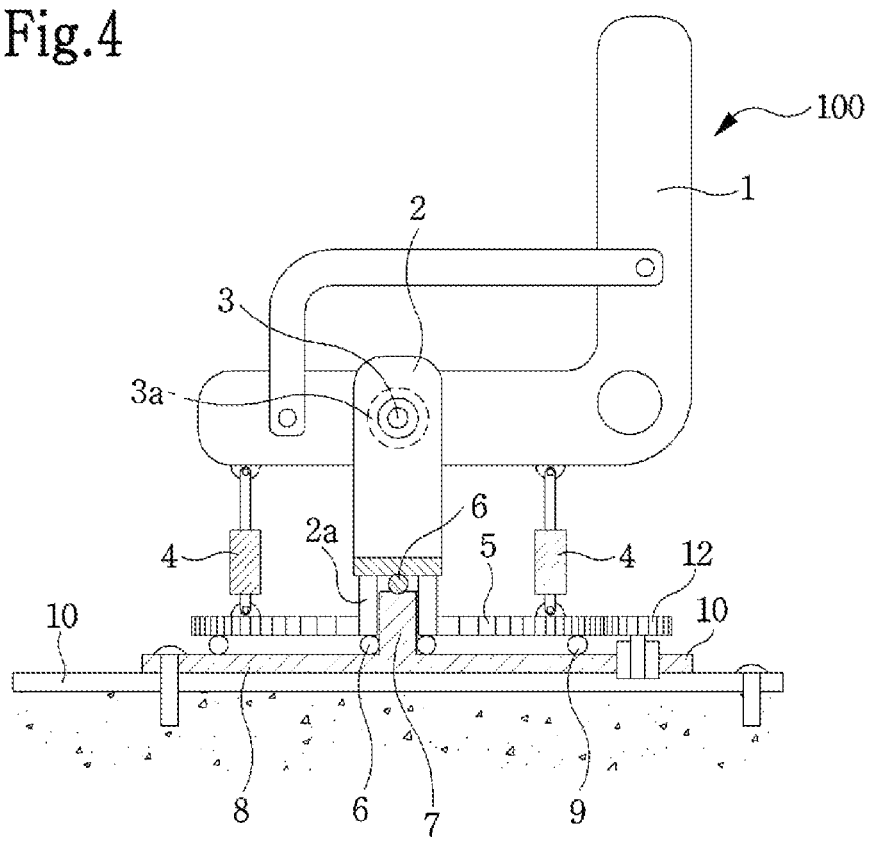
FIG. 4 is a side view of a chair structure of a virtual reality theater structure according to the present invention.

Accordingly, the chair structure as intended for the purpose, as shown in FIG. 3 and FIG. 4, an up down rotation plate 2 is provided at left and right sides on a lower part of the chair 1 and a up down rotation shaft 3 is provided below the up down rotation plate 2, and the chair is connected thereto such that the chair 1 is rotated upward within 30° and upward 120-150°.

However, it is advised for recommendation that when the chair is rotated downward greater than 30°, a viewer may be pushed frontward from the chair 1, and when the chair is rotated upward greater than 90°, the viewer may be pushed rearward from the chair.

According to the present invention, a rotation plate on a center of which a groove is formed is provided below the rotation plate 2 and buffering devices 4 are provided on both sides of the rotation plate 5.

The buffering device 4 includes air spring, gas shock observer, urethane resilient structure, etc., which are already disclosed, but it is not limited thereto. The buffering devices at the left and right sides serve to fix and stop the chair at upward 20° through the air spring or internal gas pressure inside the gas shock observer when a viewer rotates upward 20°, or return or rotate at another angle with less force when the chair is returned or rotates to another angle.

Meanwhile, a fixing plate 8 is provided below the rotation plate, which is fixed to a floor of an installation place and a rotation central shaft 7 is arranged on a center of the fixing plate 8. Here, the bearings is arranged between the rotation central shaft 7 and the rotation plate 5, allowing the rotation plate 5 to be rotated smoothly around the rotation central shaft 7. Accordingly, the rotation plate 5 is rotated by the rotation central shaft 7, and when a viewer rotates the chair with his/her force, an acceleration force is produced if there is no braking force, and thus it is difficult to control the rotation including stopping at a desired location, causing safe accidents.

In order to avoid the accidents wheels made of urethane having great friction force are provided between the rotation plate 5 and the fixing plate 8, or a floor plate 10 is made of steel having magnetic property, or a braking wheel 9 provided with magnet is provided therebetween.

Figure 5B:
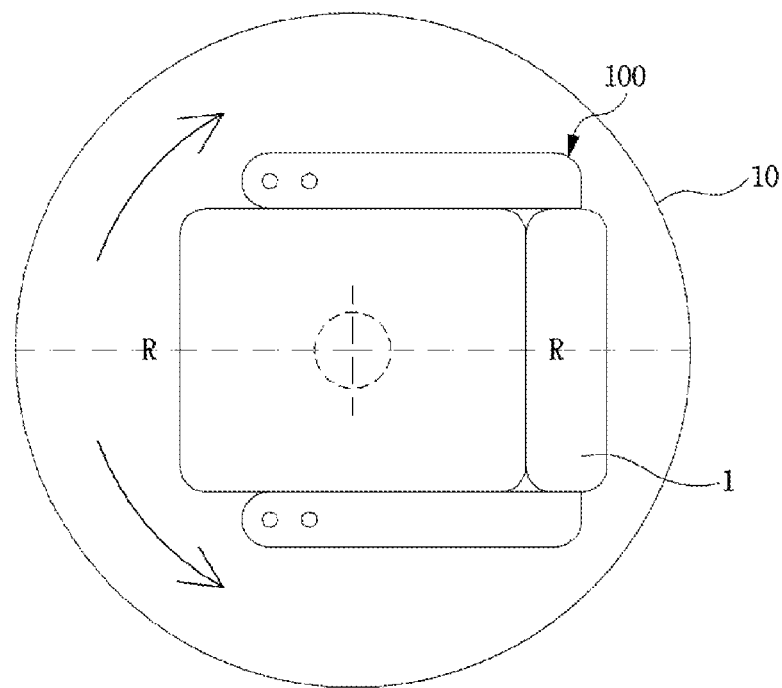
FIG. 5B is a view of a left right rotation central shaft of the chair structure of a virtual reality theater structure according to the present invention.

In this case, even though the chair is rotated by a viewer' force, the chair is braked by a magnetic wheel or urethane wheel and further is driven with small force. Accordingly, the chair of the present invention is featured such that, as shown in FIG. 5A and FIG. 5B, the chair can be rotated up and downward while the rotation plate 5, the left and right buffering devices 4a, 4b, the up down rotation plate 2 and the up down rotation shaft 3 are rotated.

Further, a disclosed vibration device linked with sound is provided on the chair structure itself of the chair 100 and a lower plate and rear plate of the chair may be vibrated due to the sound and the vibration may be felt by a viewer.

Meanwhile, by deleting the braking wheel 9 consisting of the urethane wheel or magnetic wheel as shown in FIG. 5A, the driving motors 3a, 12 are connected to the up down rotation shaft 3 and the left right rotation plate 5, respectively, as shown in FIG. 3, and the electronic control devices 11a, 11b are provided on an arm rest on an upper part of the chair, thereby controlling electronically the up down rotation and the left right rotation of the chair.

That is, the chair may be rotated up and downward while it is rotated left and rightward wherein the up down rotation is driven or braked by the left and right buffering devices 4a, 4b and the left and right rotation is driven or braked by the braking wheel 9.

Accordingly, the virtual reality theater structure of the present invention may be utilized as various virtual reality image theater structures including virtual reality experience theater structure of a theme park.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A virtual reality theater structure comprising:
a reflection screen which has a view angle of up down 40-360° and left right 120-360°, an effective view angle range for virtual reality, and reflects polarized light;
a projection system for projecting 3D images for a left eye and a right eye on the reflection screen at an effective view angle for a virtual reality image;
an up down rotation plate which is provided on a left and right side of a chair and rotates up and downward 40-120°; and
the chair comprising a chair structure that is provided with a rotation central shaft and a rotation plate below the up down rotation plate which rotate left and rightward 120-360°, wherein the chair structure is arranged per area unit to have a rotation radius around which the chair structure is rotated 360° leftward and rightward based on the rotation central shaft so that a viewer views the virtual reality 3D image within a view angle greater than up down 40° and left right 200° provided by the reflection screen while the chair structure rotates left and rightward and up and downward.

2. The virtual reality theater structure of claim 1, further comprising left and right buffering devices including air springs and gas shock observers on a lower part of the chair based on the rotation central shaft of the chair structure and at both sides of the rotation plate, wherein the rotation plate, the up down rotation plate and the left and right buffering devices are rotated simultaneously around the rotation central shaft of the chair structure.

3. The virtual reality theater structure of claim 1, wherein the reflection screen consists of a dome type screen having a reflection rate of 1.1 gain or more.

4. The virtual reality theater structure of claim 1, wherein the reflection screen consists of a circular type screen having a reflection rate of 1.1 gain or more.

5. The virtual reality theater structure of claim 1, wherein the reflection screen consists of a polygonal type screen having a reflection rate of 1.1 gain or more.

6. The virtual reality theater structure of claim 1, further comprising a vibration device that is linked with sound is provided on the chair structure to feel the vibration in accordance with the sound.

7. The virtual reality theater structure of claim 1, wherein a wheel made of plastic having a great friction force is provided between the rotation plate of the chair and a fixing plate, or a floor plate is made of steel having magnetic property and a braking wheel consisting of magnet wheel is provided therebetween.

8. A virtual reality theater structure comprising:
a reflection screen which has a view angle of up down 40-360° and left right 120-360°, an effective view angle range for virtual reality, and reflects polarized light;
a projection system for projecting 2D images at an effective view angle for a virtual reality image;
an up down rotation plate which is provided on a left and right side of a chair and rotates up and downward 40-120°, and
the chair comprising a chair structure that is provided with a rotation central shaft and a rotation plate below the up down rotation plate which rotate left and rightward 120-360°, wherein the chair structure is arranged per area to have a rotation radius around which the chair structure is rotated 360° left and rightward based on the rotation central shaft so that a viewer views the virtual reality 2D image within a view angle greater than up down 40° and left right 200° provided by the reflection screen while the chair structure rotates left and rightward and up and downward.

9. The virtual reality theater structure of claim 8, further comprising a vibration device that is linked with sound is provided on the chair structure to feel the vibration in accordance with the sound.

10. The virtual reality theater structure of claim 8, wherein the reflection screen consists of a dome type screen.

11. The virtual reality theater structure of claim 8, wherein the reflection screen consists of a circular type screen.

12. The virtual reality theater structure of claim 8, wherein the reflection screen consists of a polygonal type screen.

13. The virtual reality theater structure of claim 2, wherein a wheel made of plastic having a great friction force is provided between the rotation plate of the chair and a fixing plate, or a floor plate is made of steel having magnetic property and a braking wheel consisting of magnet wheel is provided therebetween.

* * * * *